United States Patent
Lee et al.

(10) Patent No.: US 7,428,267 B2
(45) Date of Patent: Sep. 23, 2008

(54) UPLINK CHANNEL ESTIMATION SYSTEM FOR ORTHOGONAL FREQUENCY DIVISION MULTIPLE ACCESS SYSTEM AND METHOD THEREOF

(75) Inventors: Young-Ha Lee, Daejeon (KR); Chang-Wahn Yu, Daejeon (KR); Youn-Ok Park, Daejeon (KR); Seung-Ku Hwang, Seoul (KR)

(73) Assignees: Electronics and Telecommunications Research Institute (KR); Samsung Electronics Co., Ltd. (KR); SK Telecom Co., Ltd. (KR); KT Corporation (KR); KTFreetel Co., Ltd. (KR); Hanaro Telecom, Inc. (KR)

( * ) Notice: Subject to any disclaimer, the term of this patent is extended or adjusted under 35 U.S.C. 154(b) by 765 days.

(21) Appl. No.: 10/970,208

(22) Filed: Oct. 20, 2004

(65) Prior Publication Data
US 2005/0141626 A1 Jun. 30, 2005

(30) Foreign Application Priority Data
Dec. 24, 2003 (KR) .................. 10-2003-0096301

(51) Int. Cl.
*H04K 1/10* (2006.01)
*H04L 27/28* (2006.01)

(52) U.S. Cl. ...................................... 375/260
(58) Field of Classification Search ............. 375/260
See application file for complete search history.

(56) References Cited

U.S. PATENT DOCUMENTS

| | | | |
|---|---|---|---|
| 2003/0128656 A1* | 7/2003 | Scarpa | 370/203 |
| 2004/0066773 A1* | 4/2004 | Sun et al. | 370/343 |
| 2004/0076239 A1* | 4/2004 | Yu et al. | 375/260 |
| 2004/0240376 A1* | 12/2004 | Wang et al. | 370/204 |

FOREIGN PATENT DOCUMENTS

| | | |
|---|---|---|
| KR | 1020020044505 | 6/2002 |
| KR | 2003-7003640 | 3/2003 |
| WO | WO 02/23841 | 3/2002 |

OTHER PUBLICATIONS

Larsson, E.G.; Guoqing Liu; Jian Li; Giannakis, G.B.; Joint symbol timing and channel estimation for OFDM based WLANs; IEEE Communications Letters, vol. 5, Issue 8, Aug. 2001 pp. 325-327.*
IEEE 2002, "Robust channel estimation in Wireless LANs for Mobile Environments," Sep. 2002, pp. 24-28.
"Channel Estimation For OFDM Systems Based on Comb-Type Pilot Arrangement in Frequency Selective Fading Channels", M. Hsieh, et al., 1998 IEEE, Jan. 13, 1998, pp. 217-225.

* cited by examiner

*Primary Examiner*—David C. Payne
*Assistant Examiner*—Nader Bolourchi
(74) *Attorney, Agent, or Firm*—Blakely, Sokoloff, Taylor & Zafman LLP

(57) ABSTRACT

In the uplink of an OFDMA system, a preamble is used to estimate a channel and then the pilot tones of a data symbol are used for channel estimation to update the channel estimate. The channel estimate is used for channel compensation, and the phase of the channel is corrected using the channel estimate obtained from the pilot tones. In this way, the channel estimation performance and hence the compensation ability can be enhanced.

16 Claims, 5 Drawing Sheets

UPLINK CHANNEL ESTIMATION SYSTEM FOR ORTHOGONAL FREQUENCY DIVISION MULTIPLE ACCESS SYSTEM AND METHOD THEREOF

CROSS REFERENCE TO RELATED APPLICATION

This application claims priority to and the benefit of Korea Patent Application No. 2003-96301 filed on Dec. 24, 2003 in the Korean Intellectual Property Office, the content of which is incorporated herein by reference.

BACKGROUND OF THE INVENTION (a) Field of the Invention

The present invention relates to an uplink channel estimation system for an orthogonal frequency division multiple access (OFDMA) system, and a method thereof.

(b) Description of the Related Art

In the OFDMA system, data are transferred on the uplink through sub-channels allocated to each subscriber. At this time, interference may occur due to a signal distortion caused by different channel environments and interference from the phase error of unmatched frequencies. When the signal distortion of channels and the frequency phase error are not compensated, the mutual orthogonality of subcarriers deteriorates to adversely affect other subcarriers. To solve this problem, a method of estimating channel variations from a reference signal and compensating for them is needed, as is a method of compensating for the frequency phase.

The channel estimation method includes a block-type estimation method using a preamble, a mid-amble, or a post-amble as the reference signal, and a comb-type estimation method using the pilot tone for a specific subcarrier as the reference signal to estimate the channel of the data subcarrier.

FIG. 1 shows an uplink sub-channel signal of the OFDMA system. Referring to FIG. 1, the first symbol of a sub-channel signal is comprised of a preamble, and the other symbols are comprised of data symbols. Each data symbol includes five pilot tones, among which four are variable-location pilot tones and the remaining one is a fixed pilot tone.

In this structure, the preamble is used to achieve channel estimation and channel compensation. However, the channel compensation is difficult to achieve in the channel environment in which the channel is estimated from the preamble, when the channel is a time-varying channel. Namely, the channel environment is different between a symbol subsequent to the preamble and the last symbol, in which case the channel compensation using a channel estimate obtained from the preamble is successful for the first symbol, but not for the last one.

SUMMARY OF THE INVENTION

The present invention is directed to a method for channel estimation and channel compensation accurately performed by the uplink sub-channels in an OFDMA system.

The present invention is also directed to a method for correction of a frequency phase error.

To achieve the above objects, the present invention performs channel estimation and channel compensation using a preamble and pilot tones.

In one aspect of the present invention, there is provided a channel estimation system for estimating an uplink channel of an OFDMA system. The channel estimation system includes: a first channel estimator for estimating a channel from a preamble of a received signal; a second channel estimator for estimating the channel from a pilot tone of a data symbol of the received signal; a data storage section for updating a channel estimate of the first channel estimator with a channel estimate of the second channel estimator and storing the updated channel estimate; and an equalizer for using the channel estimate stored in the data storage section to perform channel compensation of the received signal.

In accordance with one embodiment of the present invention, the received signal used for channel estimation of the second channel estimator includes a channel-compensated signal of the equalizer.

In accordance with another embodiment of the present invention, the channel estimation system further includes a phase corrector for using the channel estimate of the second channel estimator to correct a phase of the received signal. Here, the channel estimation system further includes an interpolator for using the channel estimate obtained from the pilot tone of the data symbol to calculate a first phase correction value for a subcarrier carrying the pilot tone, and interpolating the first phase correction value for subcarriers other than the subcarrier carrying the pilot tone to calculate a second phase correction value. The phase corrector uses the first and second phase correction values of the interpolator to correct a phase of the data symbol.

In accordance with a further embodiment of the present invention, the phase corrector performs a phase correction for an n-th data symbol of the received signal using the channel estimate obtained from the pilot tone of the n-th data symbol at the second channel estimator.

In accordance with another embodiment of the present invention, the equalizer performs channel compensation for a first data symbol of the received signal using the channel estimate obtained from the preamble at the first channel estimator. The equalizer performs channel compensation for at least a second data symbol of the received signal using a channel estimate of the data storage section updated with the channel estimate obtained from the pilot tone of the previous data symbol.

In another aspect of the present invention, there is provided a channel estimation method for estimating an uplink channel in an OFDMA system. The channel estimation method of the present invention includes: (a) estimating a channel from a preamble of a received signal, and storing the channel estimate in a storage section; (b) using the channel estimate of the storage section to perform channel compensation for a data symbol of the received signal; (c) estimating the channel from a pilot tone of the channel-compensated data symbol; and (d) updating the channel estimate of the storage section with the channel estimate obtained from the pilot tone. The steps (b), (c), and (d) are repeated for a second data symbol of the received signal.

In accordance with one embodiment of the present invention, the channel estimation method further includes: (e) using the channel estimate obtained from the pilot tone to correct a phase of the channel-compensated data symbol, In another aspect of the present invention, there is provided a recording medium storing a program that has a function of estimating an uplink channel of an OFDMA system. The program stored in the recording medium of the present invention includes: a first function of estimating a channel from a preamble of a received signal, and storing the channel estimate in a storage section; a second function of using the channel estimate of the storage section to perform channel compensation for a data symbol of the received signal; a third function of estimating the channel from a pilot tone of the channel-compensated data symbol; and a fourth function of updating the channel estimate of the storage section with the channel estimate obtained from the pilot tone, and correcting a phase of the channel-compensated data symbol using the channel estimated obtained from the pilot tone. The program repeatedly performs the functions (b), (c), and (d) for a second data symbol of the received signal.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

An uplink channel estimation system for an OFDMA system and a method thereof according to an embodiment of the present invention are hereinafter described in detail with reference to the accompanying drawings.

First, the uplink channel estimation method for an OFDMA system according to an embodiment of the present invention is schematically described with reference to FIG. 2.

Figure 1:
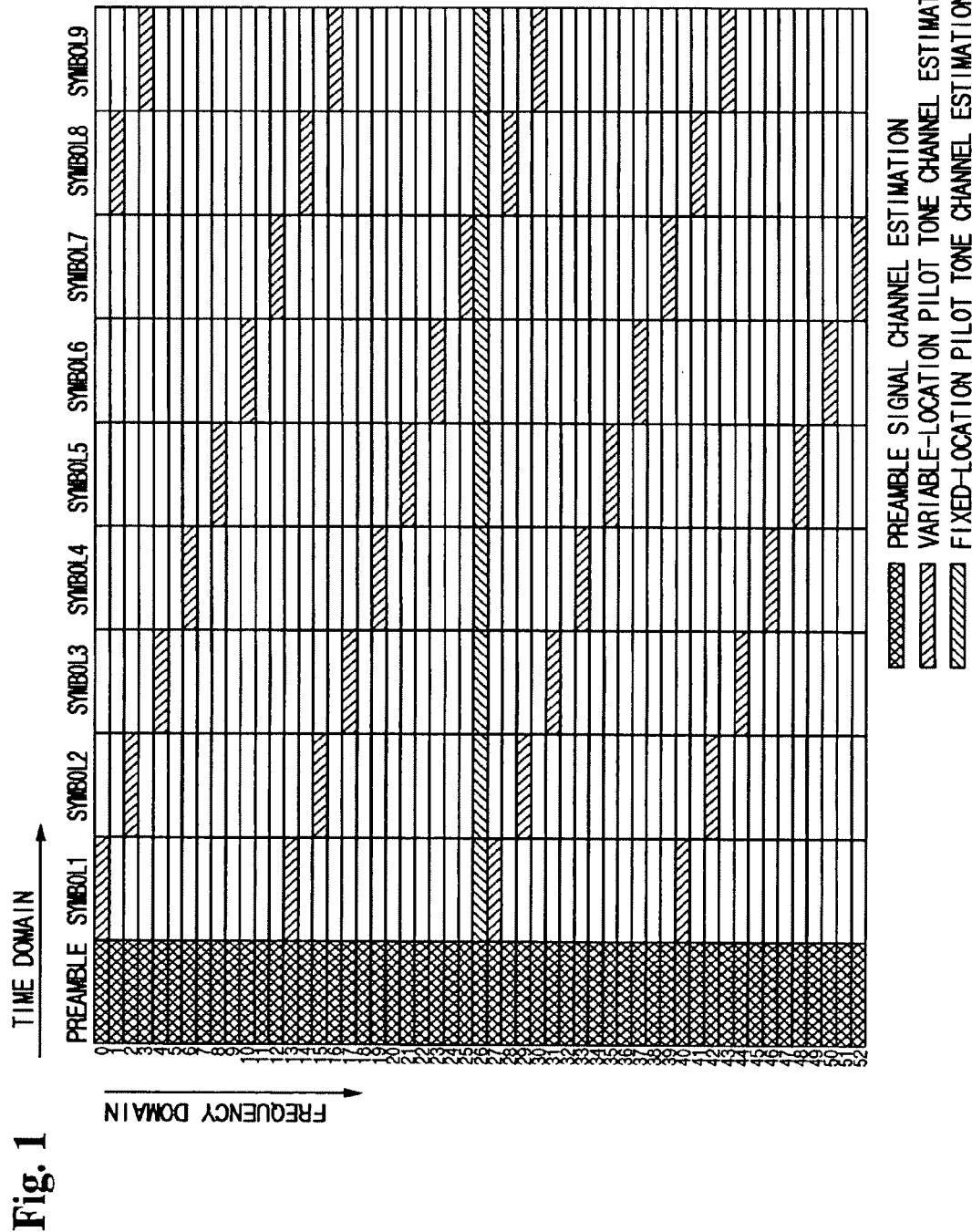
FIG. 1 shows an uplink sub-channel signal of an OFDMA system.
Figure 2:
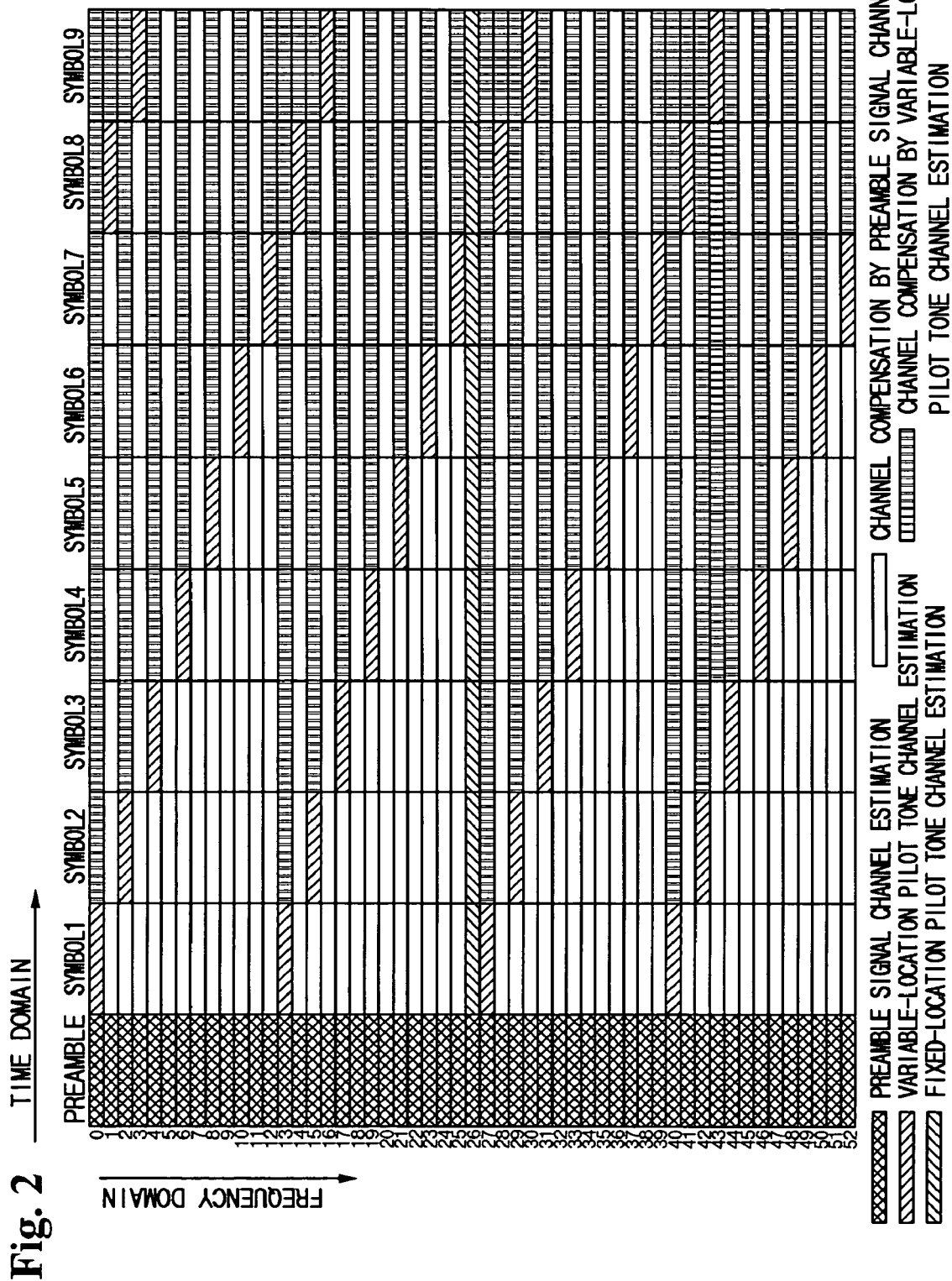
FIG. 2 is a schematic diagram showing a method for channel estimation and channel compensation in an uplink sub-channel signal of an OFDMA system according to an embodiment of the present invention.

FIG. 2 is a schematic diagram showing a method for channel estimation and channel compensation in an uplink sub-channel signal of an OFDMA system according to an embodiment of the present invention.

Referring to FIG. 2, a preamble is used for channel estimation. The channel estimate obtained from the preamble is used to achieve channel compensation for a first symbol. The pilot tones of the first symbol are used for channel estimation, and the channel estimate thus obtained is added to the channel estimate obtained from the preamble to give a first channel estimate. Then the first channel estimate for the first symbol, i.e., the channel estimate obtained from the preamble and the pilot tones of the first symbol, is used to achieve channel compensation for a second symbol. The pilot tones of the second symbol are used for channel estimation, and the channel estimate thus obtained is added to the first channel estimate obtained from the first symbol to give a second channel estimate. These procedures are repeatedly performed. Hence, the channel estimate for channel compensation of the last symbol is a channel estimate obtained from the preamble and the pilot tones of the preceding symbols. The locations of the pilot tones vary from subcarrier to subcarrier as illustrated in FIG. 2, so the channel estimation using the pilot tones is expanded over all the subcarriers.

The channel estimation system and the channel estimation method according to an embodiment of the present invention are described below in detail with reference to FIGS. 3 to 7.

Figure 3:
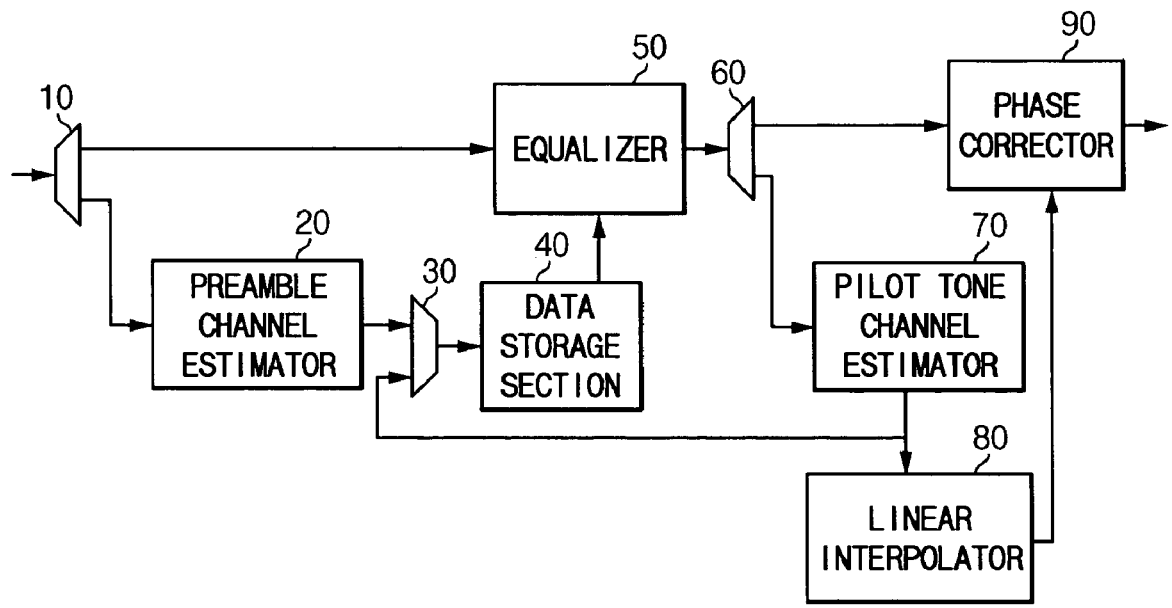
FIG. 3 is a schematic block diagram of a channel estimation system according to an embodiment of the present invention.

FIG. 3 is a schematic block diagram of a channel estimation system according to an embodiment of the present invention.

The channel estimation system according to the embodiment of the present invention comprises, as shown in FIG. 3, demultiplexers 10 and 60, a preamble channel estimator 20, a multiplexer 30, a data storage section 40, an equalizer 50, a pilot tone channel estimator 70, a linear interpolator 80, and a phase corrector 90.

The demultiplexer 10 receives subcarrier symbols in series. It sends the received symbol that is a preamble to the preamble channel estimator 20, and the received symbol that is a data symbol to the equalizer 50. In one sub-channel signal, the first symbol is the preamble and the others are all data symbols. Hence, the demultiplexer 10 sends the first symbol to the preamble channel estimator 20 and the other ones to the equalizer 50.

Upon receiving the preamble from the demultiplexer 10, the preamble channel estimator 20 estimates the channel using the preamble, and stores the inverse number of the channel estimate in the data storage section 40 via the multiplexer 30. The preamble is a symbol given to every subcarrier, so the use of the preamble enables channel estimation for all the subcarriers. The transmitted signal x(n), the received signal r(n), and the channel response h(n) at the subscriber side satisfy the following Equation 1, which can be rewritten into Equation 2 by Fourier transform. When the transmitted signal x(n) is the preamble, which is already known to the receiver, the preamble channel estimator 20 estimates the channel using the preamble as represented by Equation 3.

$$r(n) = x(n) \otimes h(n) \quad \text{[Equation 1]}$$

$$R(k) = X(k)H(k) \quad \text{[Equation 2]}$$

where R(k), X(k), and H(k) are the values of received signal r(n), transmitted signal x(n), and channel response h(n) as converted by Fourier transform, respectively.

$$H(k) = \frac{R_{pr}(k)}{X_{pr}(k)} \quad \text{[Equation 3]}$$

where $X_{pr}(k)$ is the value of the transmitted preamble converted by Fourier transform, and $R_{pr}(k)$ is the value of the received preamble converted by Fourier transform.

The multiplexer 30 stores the inverse numbers of the channel estimates H(k) from the preamble channel estimator 20 and the pilot tone channel estimator 70 in the data storage section 40.

The data storage section 40 updates the existing channel estimate with a channel estimate recently output from the multiplexer 30, and the equalizer 50 uses the channel estimate H(k) stored in the data storage section 40 for channel compensation of the received signal r(n) as represented by Equation 4.

$$X_d(k) = \frac{R_d(k)}{H(k)}$$ [Equation 4]

where $X_d(k)$ is the value of the channel-compensated signal converted by Fourier transform, and $R_d(k)$ is the value of the received signal $r_d(n)$ converted by Fourier transform.

The demultiplexer 60 sends the channel-compensated symbol $X_d(k)$ of the equalizer 50 to the pilot tone channel estimator 70 and the phase corrector 90. The pilot tone channel estimator 70 estimates the channel using the pilot tones and sends the channel estimate H(k) to the multiplexer 30 and the linear interpolator 80. The linear interpolator 80 performs a linear interpolation using the channel estimate of the pilot tone channel estimator 70 and sends the interpolated signal to the phase corrector 90. The phase corrector 90 uses the output of the linear interpolator 80 to correct the phase of the channel-compensated data of the equalizer 50.

The operation of the channel estimation system of FIG. 3 is described below in detail with reference to FIGS. 4 to 8.

First, the preamble channel estimator 20 and the pilot tone channel estimator 70 of FIG. 3 are described with reference to FIG. 4.

Figure 4:
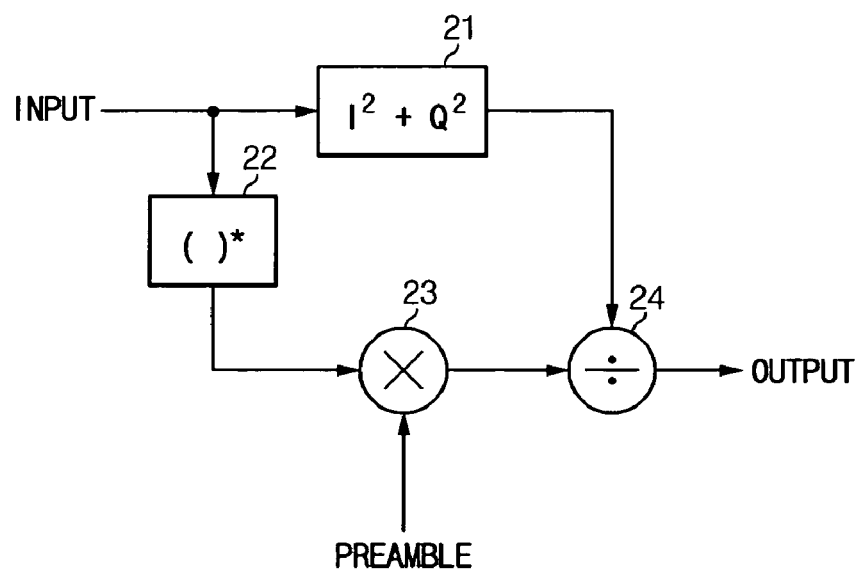
FIG. 4 is a detailed block diagram of the preamble channel estimator of FIG. 3.

FIG. 4 is a detailed block diagram of the preamble channel estimator of FIG. 3.

Referring to FIG. 4, the signal $R_{pr}(k)$ fed into the preamble channel estimator 20 is squared into $(mag[R_{pr}(k)])^2$ at a first calculator 21, or conjugated at a second calculator 22 and then multiplied by the preamble $X_{pr}(k)$ at a third calculator 23. The product of the conjugated signal $(R_{pr}(k))^*$ and the preamble $X_{pr}(k)$ is divided by the output $(mag[R_{pr}(k)])^2$ of the first calculator 21 at a fourth calculator. Hence, the output of the preamble channel estimator 20 is given by:

$$\frac{1}{H(k)} = \frac{X_{pr}(k)}{R_{pr}(k)} = \frac{X_{pr}(k) \cdot (R_{pr}(k))^*}{\{mag(R_{pr}(k))\}^2}$$ [Equation 5]

The pilot tone channel estimator 70 performs channel estimation in the same manner as the preamble channel estimator 20, because the receiver and the transmitter share the pilot tones. Accordingly, the channel estimate H(k) obtained from the pilot tones is given by the following Equation 6. The locations of the pilot tones vary from symbol to symbol, so the channel is estimated only for the subcarrier of the frequency band corresponding to the pilot tones. Thus the data storage section 40 updates the channel estimate only for the subcarrier of a corresponding frequency band, while it remains the previous channel estimate for subcarriers of other frequency bands.

$$\frac{1}{H(k)} = \frac{X_{pi}(k)}{R_{pi}(k)} = \frac{X_{pi}(k) \cdot (R_{pi}(k))^*}{\{mag(R_{pi}(k))\}^2}$$ [Equation 6]

where $X_{pi}(k)$ is the pilot tone of the transmitted symbol, and $R_{pi}(k)$ is the pilot tone of the received symbol.

The linear interpolator 80 and the phase corrector 90 are described below with reference to FIGS. 5 and 6.

Figure 5:
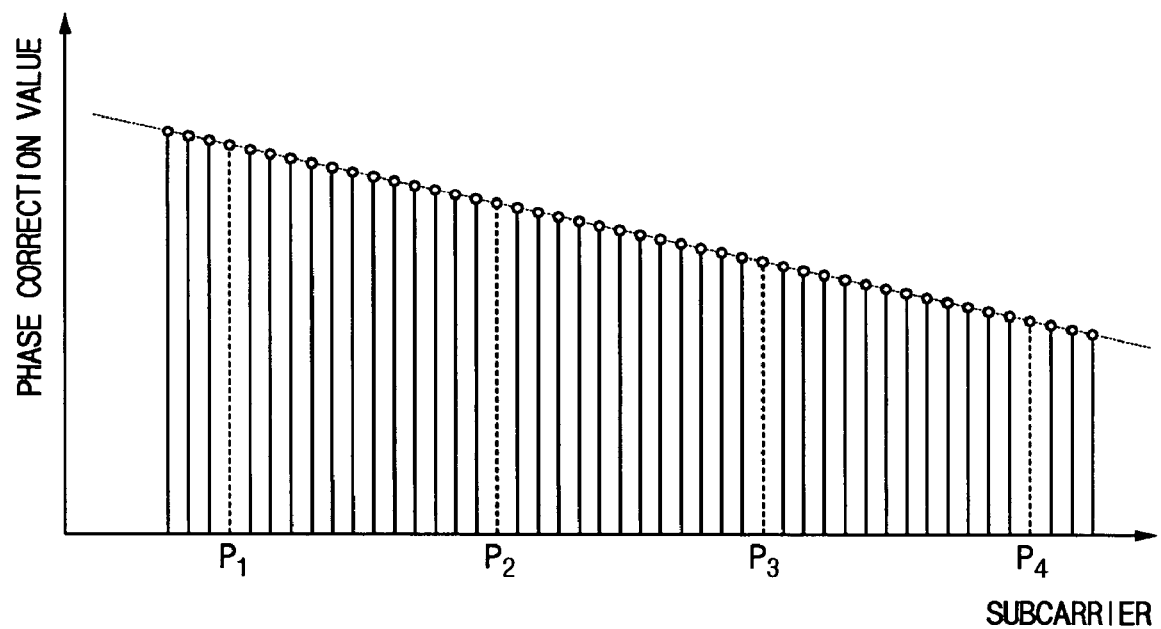
FIG. 5 is an illustration of the principle of the linear interpolator of FIG. 3.
Figure 6:
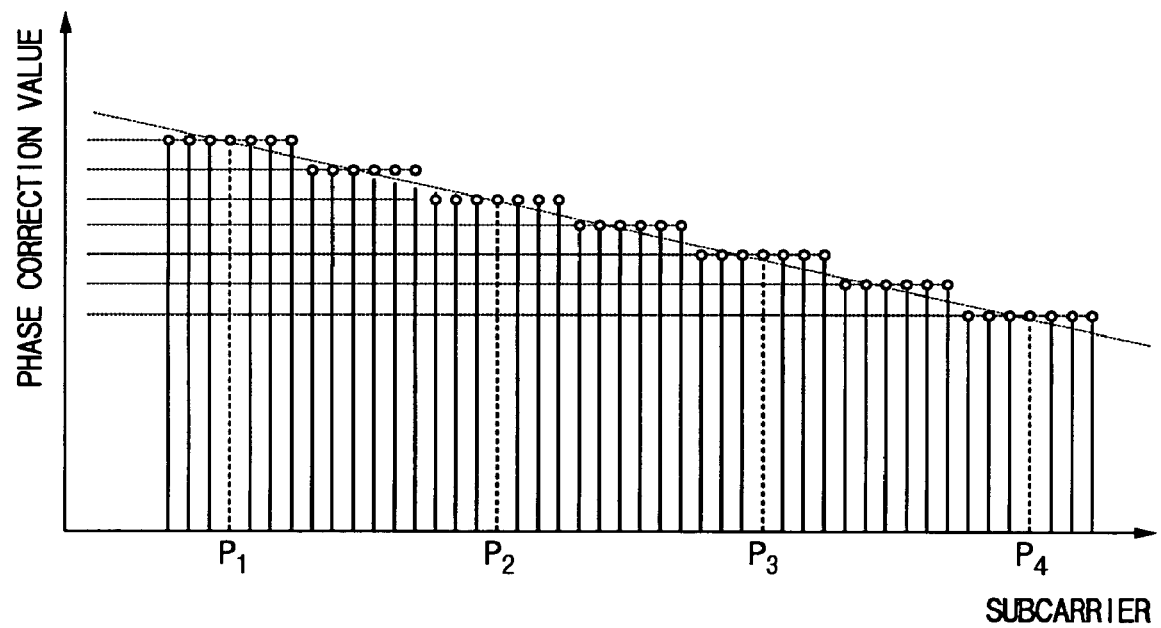
FIG. 6 shows an exemplary operation of the linear interpolator of FIG. 3.

FIG. 5 is an illustration showing the principle of the linear interpolator of FIG. 3, and FIG. 6 shows an exemplary operation of the linear interpolator of FIG. 3.

The linear interpolator 80 uses the channel estimate of the pilot tone channel estimator 70 to estimate the phase correction value of subcarriers not carrying pilot tones, and the phase corrector 90 performs a phase correction according to the output of the linear interpolator 80. The phase AO of the inverse number of the channel estimate H(k) obtained from the pilot tones according to the Equation 6 is given by the following Equation 7. Hence, the phase corrector 90 corrects the phase of the subcarrier carrying the corresponding pilot tones by $\Delta\theta$.

$$\Delta\theta = \arg\left\{\frac{1}{H(k)}\right\}$$ [Equation 7]

For the subcarrier not carrying pilot tones, the phase correction value of the pilot tones is interpolated for estimation of the phase correction value. Namely, the linear interpolator 80 calculates phase correction values $\Delta\theta_1$ to $\Delta\theta_4$ carrying four variable-location pilot tones $P_1$ to $P_4$ from the inverse numbers of the channel estimates $H(k_1)$ to $H(k_4)$ obtained from the pilot tones $P_1$ to $P_4$, respectively, according to Equation 7. Subsequently, the linear interpolator 80 linearly interpolates the phase correction values $\Delta\theta_1$ to $\Delta\theta_4$ to generate phase correction values for another subcarrier, as represented by Equation 5.

To simplify the implementation of the linear interpolator 80, the average of the phase correction values for two adjacent pilot tones can be interpolated. Generally, there are 12 subcarriers between two adjacent variable-location pilot tones. Hence, the phase correction value $\Delta\theta_1$ obtained from the pilot tone $P_1$ is applied to the first, second, and third subcarriers between the two pilot tones $P_1$ and $P_2$, as illustrated in FIG. 6. The average of the two phase correction values $\Delta\theta_1$ and $\Delta\theta_2$ is applied to the fourth to ninth subcarriers, the phase correction value $\Delta\theta_2$ obtained from the pilot tone $P_2$ being applied to the tenth, eleventh, and twelfth subcarriers. The linear interpolator 80 calculates the phase correction values for all the subcarriers in this way and sends them to the phase corrector 90. Then the phase corrector corrects the phase of each subcarrier using the corresponding phase correction value.

The process for channel estimation/compensation and phase correction in the aforementioned channel estimation system is described in detail with reference to FIGS. 2 and 7.

The signal fed into a receiver (not shown) is converted to a digital signal at an analog-to-digital converter, and transformed by Fourier transform at a Fourier transformer. In the embodiment of the present invention, channel estimation and channel compensation are performed on the signal converted by Fourier transform.

Figure 7:
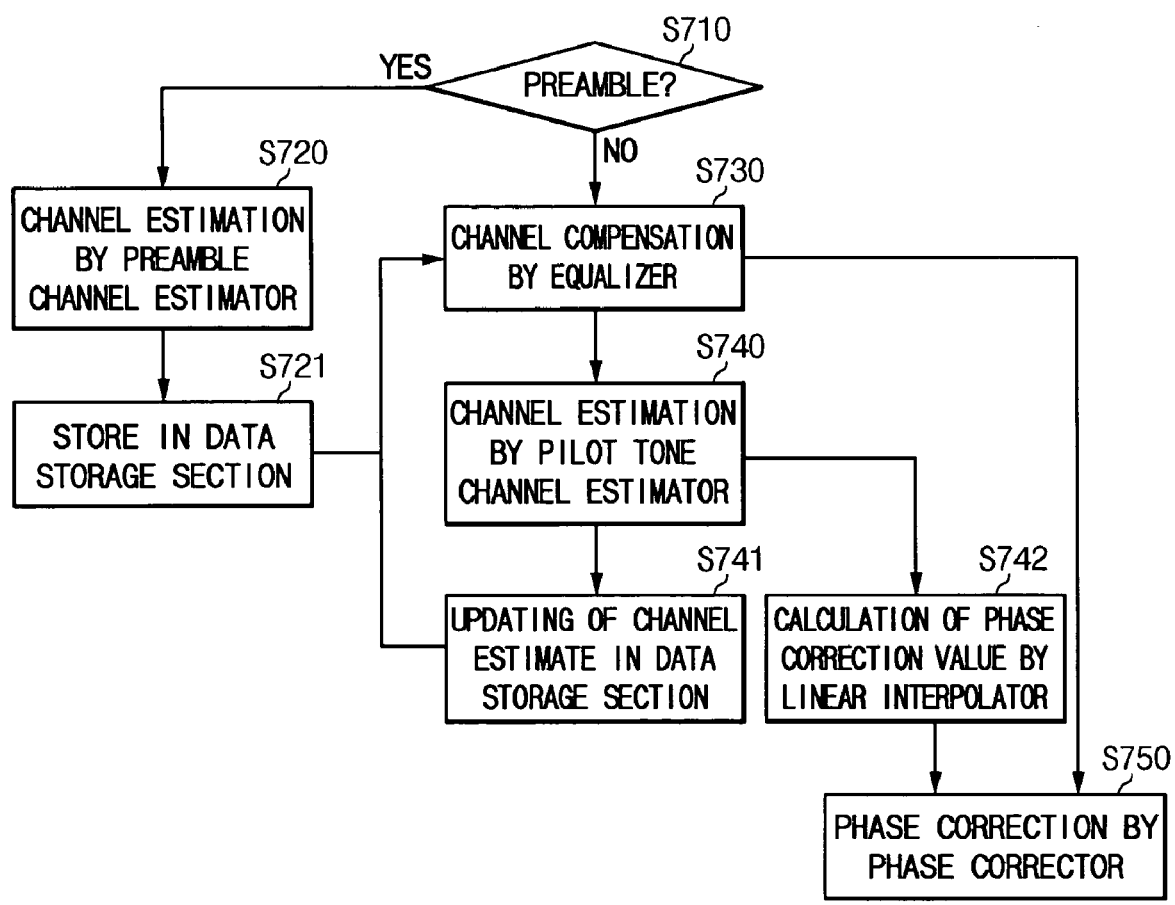
FIG. 7 is a flow chart of a channel estimation method according to an embodiment of the present invention.

Referring to FIGS. 2 and 7, upon receiving a sub-channel signal, the demultiplexer 10 determines in step S710 whether the symbol is a preamble or a data symbol. If the sub-channel signal is a preamble, then the demultiplexer 10 sends the preamble to the preamble channel estimator 20, which then estimates the channel using the preamble according to Equation 5, in step S720. The channel estimate obtained from the preamble is stored in the data storage section 40 via the multiplexer 30, in step S721. Upon receiving a first data symbol subsequent to the preamble, the demultiplexer 10 sends the first data symbol to the equalizer 50 for channel compensation according to Equation 4, in step S730. The channel-compensated data symbol is sent to the pilot tone channel estimator 70 and the phase corrector 90 via the demultiplexer 60.

The pilot tone channel estimator 70 estimates the channel for the channel-estimated data symbol using pilot tones according to Equation 6, in step S740. The channel estimate obtained from the pilot tones is stored in the data storage section 40 via the multiplexer 30, in step S741. The channel estimate obtained from the pilot tones of the first data symbol updates the channel estimate for the subcarrier carrying the corresponding pilot tones. Namely, the channel estimate for the subcarrier carrying the pilot tones of the first data symbol among the channel estimates obtained from the preamble is stored in the data storage section 40. The channel estimate obtained from the preamble and the channel estimate from the pilot tones as stored in the data storage section 40 are used for channel compensation of a second data symbol, in step S730. The procedures of the steps S740 and S741 are repeated to achieve channel estimation and channel compensation of the input data symbol.

The channel estimate of the pilot tone channel estimator 70 is sent to the linear interpolator 80, which then calculates the phase correction value of another subcarrier using the channel estimate obtained from the variable-location pilot tones, in step S742. The phase corrector 90 uses the phase correction value calculated in the step S742 to correct the phase of the channel-compensated first data symbol from the equalizer 50 via the demultiplexer 60, in step S750. In the same manner of the steps S742 to S750, the channel estimate obtained from the pilot tones of the second data symbol is used to estimate the phase correction value of the second data symbol channel-compensated in the step S730 and achieve a phase correction. The same procedures are performed for a phase correction of another subsequent data symbol.

The above-stated channel estimation method of the present invention can be implemented as a program and stored in a recording medium (e.g., CD-ROM, RAM, floppy disk, hard disk, magneto-optical disc, etc.) readable by a computer.

As described above, the present invention enhances the channel estimation performance and hence the compensation ability in performing channel estimation, channel compensation, and phase correction on the uplink of the OFDMA system to reduce uplink data demodulation, interference to adjacent sub-channels, and interference to other subscribers.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A channel estimation system, which is for estimating a channel of an orthogonal frequency division multiple access (OFDMA) system, the channel estimation system comprising:
    a first channel estimator for estimating a channel from a preamble of a received signal;
    a second channel estimator for estimating the channel from a variable-location pilot tone of a data symbol of the received signal;
    a data storage section for updating a channel estimate of the first channel estimator stored in the data storage section with a channel estimate of the second channel estimator and storing the updated channel estimate; and
    an equalizer for using the updated channel estimate to perform channel compensation of the received signal, wherein channel compensation for a later data symbol uses channel estimates from all data symbols of the received signal prior to the later data symbol.

2. The channel estimation system as claimed in claim 1, wherein the received signal used for channel estimation of the second channel estimator includes a channel-compensated signal of the equalizer.

3. The channel estimation system as claimed in claim 2, further comprising:
    a phase corrector for using the channel estimate of the second channel estimator to correct a phase of the received signal.

4. The channel estimation system as claimed in claim 3, further comprising:
    an interpolator for using the channel estimate obtained from the pilot tone of the data symbol to calculate a first phase correction value for a subcarrier carrying the pilot tone, and interpolating the first phase correction value for subcarriers other than the subcarrier carrying the pilot tone to calculate a second phase correction value,
    the phase corrector using the first and second phase correction values of the interpolator to correct a phase of the data symbol.

5. The channel estimation system as claimed in claim 4, wherein the first phase correction value includes a phase of an inverse value of the channel estimate obtained from the pilot tone.

6. The channel estimation system as claimed in claim 3, wherein the phase corrector performs a phase correction for an n-th data symbol of the received signal using the channel estimate obtained from the pilot tone of the n-th data symbol at the second channel estimator.

7. The channel estimation system as claimed in claim 1, wherein upon receiving the channel estimate from the second channel estimator, the data storage section updates a channel estimate for a subcarrier carrying the pilot tone used for channel estimation of the second channel estimator.

8. The channel estimation system as claimed in claim 1, wherein the equalizer performs channel compensation for a first data symbol of the received signal using the channel estimate obtained from the preamble at the first channel estimator,
    the equalizer performing channel compensation for at least a second data symbol of the received signal using a channel estimate of the data storage section updated with the channel estimate obtained from the pilot tone of a previous data symbol.

9. A channel estimation method, which is for estimating a channel in an OFDMA system, the channel estimation method comprising:
    (a) estimating a channel from a preamble of a received signal, and storing the channel estimate in a storage section;
    (b) using the stored channel estimate to perform channel compensation for a data symbol of the received signal;
    (c) estimating the channel from a variable-location pilot tone of the channel-compensated data symbol; and
    (d) updating the stored channel estimate with the channel estimate obtained from the pilot tone,
    the steps (b), (c), and (d) being repeated for a second data symbol of the received signal, wherein channel compensation for a later data symbol uses channel estimates from all data symbols of the received signal prior to the later data symbol.

10. The channel estimation method as claimed in claim 9, further comprising:

(e) using the channel estimate obtained from the pilot tone to correct a phase of the channel-compensated data symbol, the step (e) being repeated for the second data symbol of the received signal.

11. The channel estimation method as claimed in claim 10, wherein the step (e) comprises:

using the channel estimate obtained from the pilot tone to calculate a phase correction value for a subcarrier carrying the pilot tone;

interpolating the phase correction value to calculate a phase correction value for a subcarrier not carrying the pilot tone; and correcting the phase of the data symbol using the phase correction value.

12. The channel estimation method as claimed in claim 9, wherein an n-th data symbol is channel-estimated using a channel estimate obtained from the preamble and the pilot tones of the first to (n-1)-th data symbols.

13. A computer-readable recording medium storing a program, which has a function of estimating a channel of an OFDMA system, the program including:

a first function of estimating a channel from a preamble of a received signal, and storing the channel estimate in a storage section;

a second function of using the channel estimate of the storage section to perform channel compensation for a data symbol of the received signal;

a third function of estimating the channel from a variable-location pilot tone of the channel-compensated data symbol; and a fourth function of updating the channel estimate of the storage section with the channel estimate obtained from the pilot tone, and correcting a phase of the channel-compensated data symbol using the channel estimated obtained from the pilot tone, the program repeatedly performing the second function, the third function, and the fourth function for a second data symbol of the received signal, wherein channel compensation for a later data symbol uses channel estimates from all data symbols of the received signal prior to the later data symbol.

14. The channel estimation system of claim 1, wherein the system is for estimating an uplink channel.

15. The channel estimation system of claim 9, wherein the system is for estimating an uplink channel.

16. The computer-readable recording medium of claim 13, wherein the medium is for estimating an uplink channel.

* * * * *